United States Patent
Burke et al.

(10) Patent No.: US 10,935,086 B2
(45) Date of Patent: Mar. 2, 2021

(54) SWITCHABLE RATCHETING WEDGE CLUTCH

(71) Applicant: Schaeffler Technologies AG & Co. KG, Herzogenaurach (DE)

(72) Inventors: Peter Burke, Charlotte, NC (US); Michael Hodge, Creston, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 165 days.

(21) Appl. No.: 16/368,947

(22) Filed: Mar. 29, 2019

(65) Prior Publication Data
US 2020/0309205 A1   Oct. 1, 2020

(51) Int. Cl.
*F16D 41/12* (2006.01)
*F16D 41/16* (2006.01)
*F16D 41/08* (2006.01)

(52) U.S. Cl.
CPC .......... *F16D 41/16* (2013.01); *F16D 41/084* (2013.01); *F16D 41/12* (2013.01)

(58) Field of Classification Search
None
See application file for complete search history.

(56) References Cited

U.S. PATENT DOCUMENTS

| | | |
|---|---|---|
| 6,244,965 B1 | 6/2001 | Klecker et al. |
| 6,481,551 B1 | 11/2002 | Ruth |
| 8,177,677 B2 * | 5/2012 | Samie ............ F16H 3/666 475/324 |
| 9,109,636 B2 | 8/2015 | Kimes et al. |
| 9,121,454 B2 * | 9/2015 | Pawley ........... F16D 41/16 |
| 2004/0118654 A1 * | 6/2004 | Robuck .......... F16D 41/12 192/46 |
| 2006/0278487 A1 * | 12/2006 | Pawley ........... F16D 41/125 192/43.1 |
| 2007/0131509 A1 * | 6/2007 | Kimes ............ F16D 41/12 192/46 |
| 2007/0278061 A1 * | 12/2007 | Wittkopp ........ F16H 3/10 192/43.1 |
| 2008/0093189 A1 * | 4/2008 | Wiesneth ........ F16F 15/1202 192/45.1 |
| 2018/0266502 A1 | 9/2018 | Shioiri et al. |
| 2018/0274604 A1 | 9/2018 | Ince et al. |

* cited by examiner

*Primary Examiner* — Charles A Fox
*Assistant Examiner* — Ryan P Dodd

(57) ABSTRACT

A switchable clutch, including: a first race including a pocket; a second race radially offset from the first race; a pawl including a portion disposed in the pocket and pivotable within the pocket; and a cage radially disposed between the first race and the second race and including a ramp. The ramp includes: a first surface; and a second surface sloping radially and circumferentially from the first surface. The first surface does not slope radially along a first circumferential direction. In a locked mode of the switchable ratcheting clutch, the pawl is in contact with the first surface and the outer race, and the first race and the second race are non-rotatably connected. In a freewheel mode of the switchable ratcheting clutch, the pawl is in contact with the second surface, and relative rotation of the first race with respect to the second race is enabled.

20 Claims, 13 Drawing Sheets

SWITCHABLE RATCHETING WEDGE CLUTCH

TECHNICAL FIELD

The present disclosure relates to a ratcheting wedge clutch switchable among locked, one-way, and freewheel modes.

BACKGROUND

Ratcheting clutches, operating in one-way mode or freewheel mode, are known.

SUMMARY

According to aspects illustrated herein, there is provided a switchable ratcheting clutch, including: a first race including a pocket; a second race radially offset from the first race; a pawl including a portion disposed in the pocket and pivotable within the pocket; and a cage radially disposed between the first race and the second race and including a ramp. The ramp includes: a first surface; and a second surface sloping radially and circumferentially from the first surface. The first surface does not slope radially along a first circumferential direction. In a locked mode of the switchable ratcheting clutch, the pawl is in contact with the first surface and the outer race, and the first race and the second race are non-rotatably connected. In a freewheel mode of the switchable ratcheting clutch, the pawl is in contact with the second surface, and relative rotation of the first race with respect to the second race is enabled.

According to aspects illustrated herein, there is provided a switchable ratcheting clutch, including: an inner race including a pocket; an outer race; a pawl including a portion disposed in the pocket and pivotable within the pocket; and a cage radially disposed between the inner race and the outer race and including a ramp, the ramp including a first surface, and a second surface sloping radially inwardly and in a first circumferential direction from the first surface. The first surface does not slope radially along a first circumferential direction. In a locked mode of the switchable ratcheting clutch, the pawl is in contact with the first surface and with the outer race, and the inner race and the outer race are non-rotatably connected. In a one-way mode of the switchable ratcheting clutch, the pawl is free of contact with the ramp, the pawl is in contact with the outer race, and relative rotation of the inner race with respect to the outer race is enabled only in a second circumferential direction, opposite the first circumferential direction.

According to aspects illustrated herein, there is provided a switchable ratcheting clutch, including: an inner race including a pocket; an outer race; a pawl including a portion disposed in the pocket and pivotable within the pocket; a cage radially disposed between the inner race and the outer race and including a ramp, the ramp including a first surface and a second surface; and a resilient element. The first surface is at a uniform distance, in a radially outer direction, from an axis of rotation for the switchable ratcheting clutch, and the second surface slopes radially inwardly and in a first circumferential direction from the first surface. In a locked mode of the switchable ratcheting clutch, the pawl is in contact with the first surface and the outer race, and the inner race, the pawl and the outer race are non-rotatably connected. In a one-way mode of the switchable ratcheting clutch, the resilient element urges the pawl into contact with the outer race, and relative rotation of the inner race with respect to the outer race is enabled only in a second circumferential direction, opposite the first circumferential direction. In a freewheel mode of the switchable ratcheting clutch, the resilient element urges the pawl into contact with the second surface, and the inner race and the outer race are rotatable with respect to each other.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
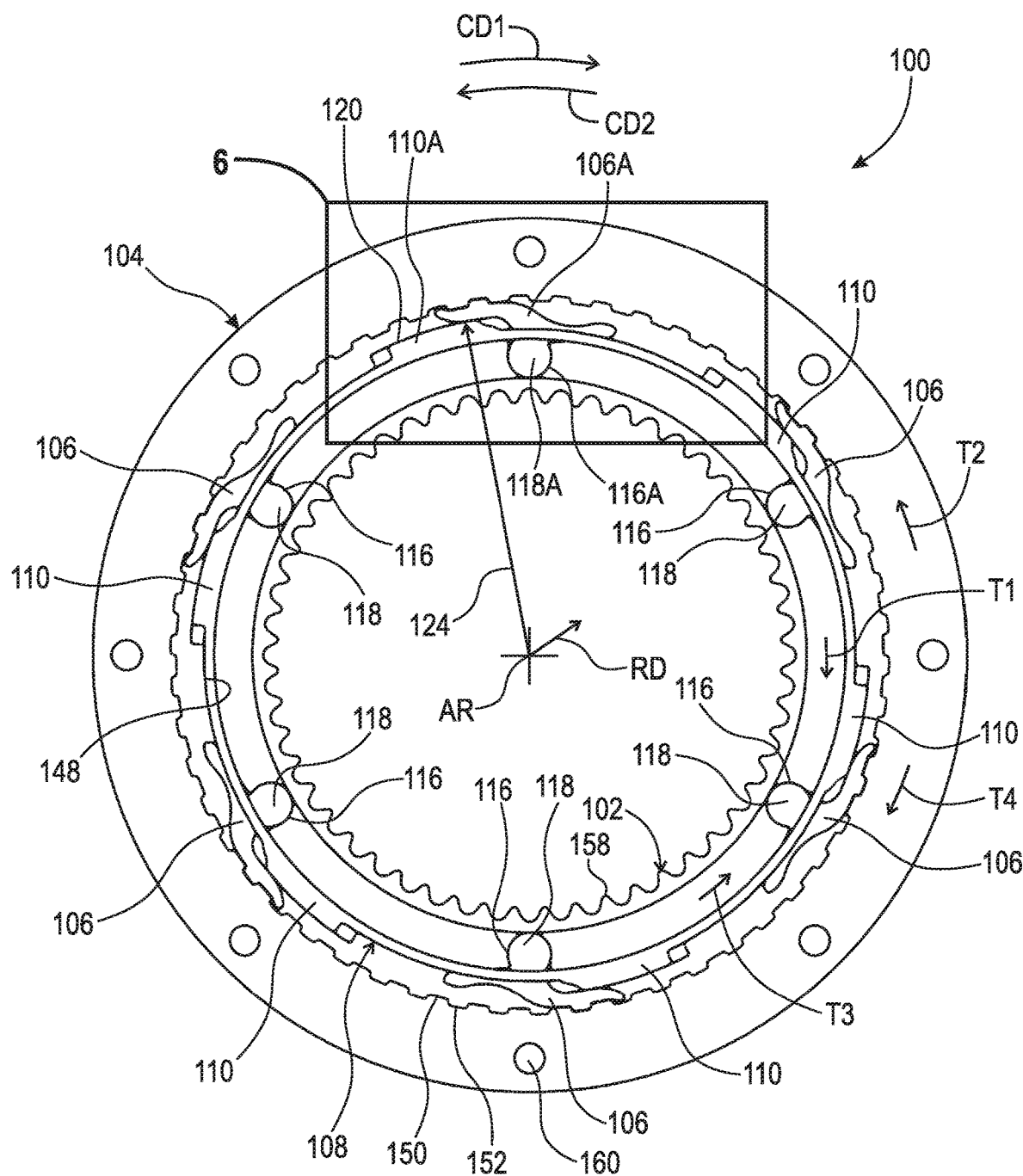
FIG. 1 is a front view of a switchable ratcheting clutch in a locked mode.

FIG. 1 is a front view of switchable ratcheting clutch 100 in a locked mode.

Figure 2:
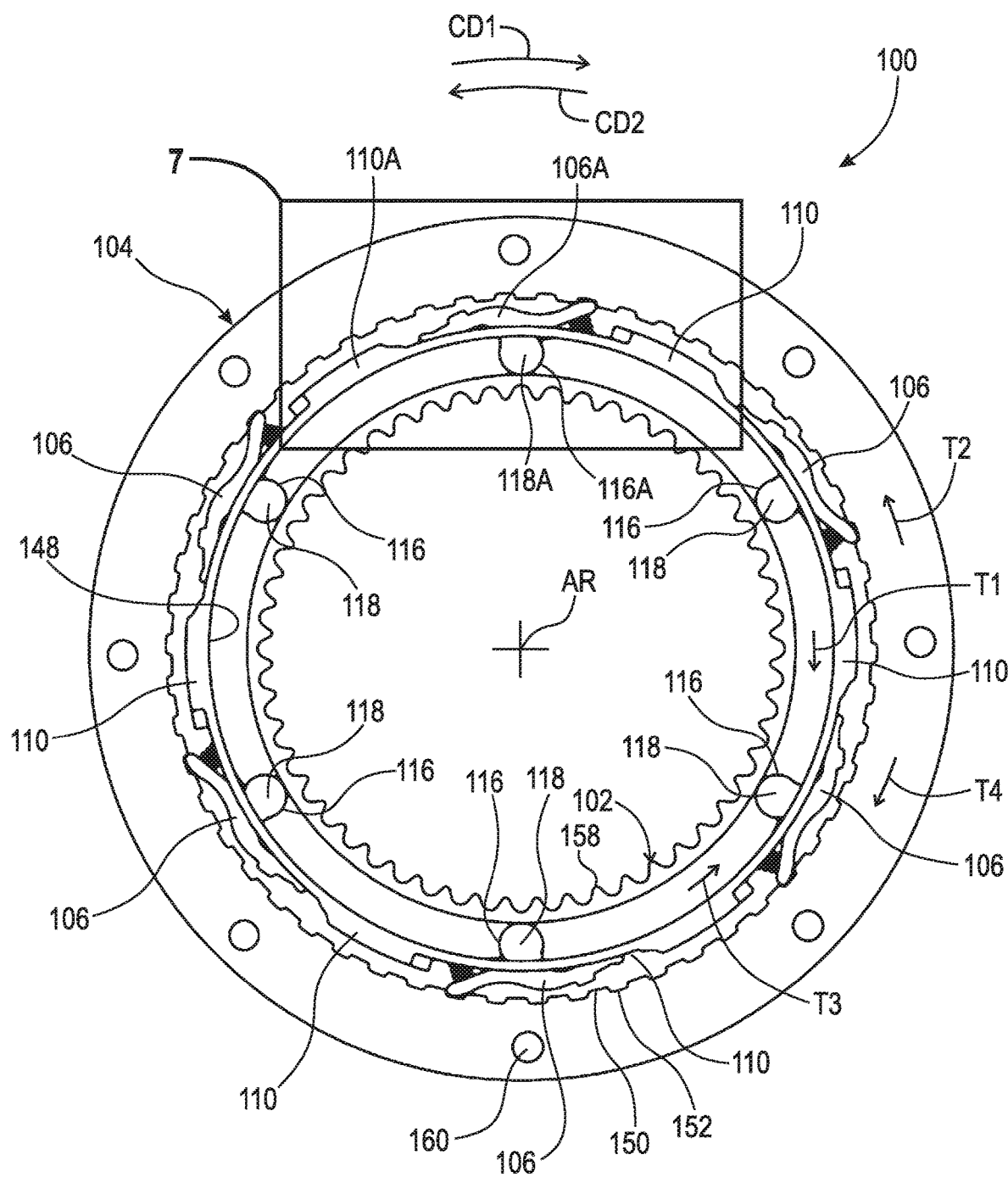
FIG. 2 is a front view of the switchable ratcheting clutch shown in FIG. 1 in a one-way mode.

FIG. 2 is a front view of switchable ratcheting clutch 100 shown in FIG. 1 in a one-way mode.

Figure 3:
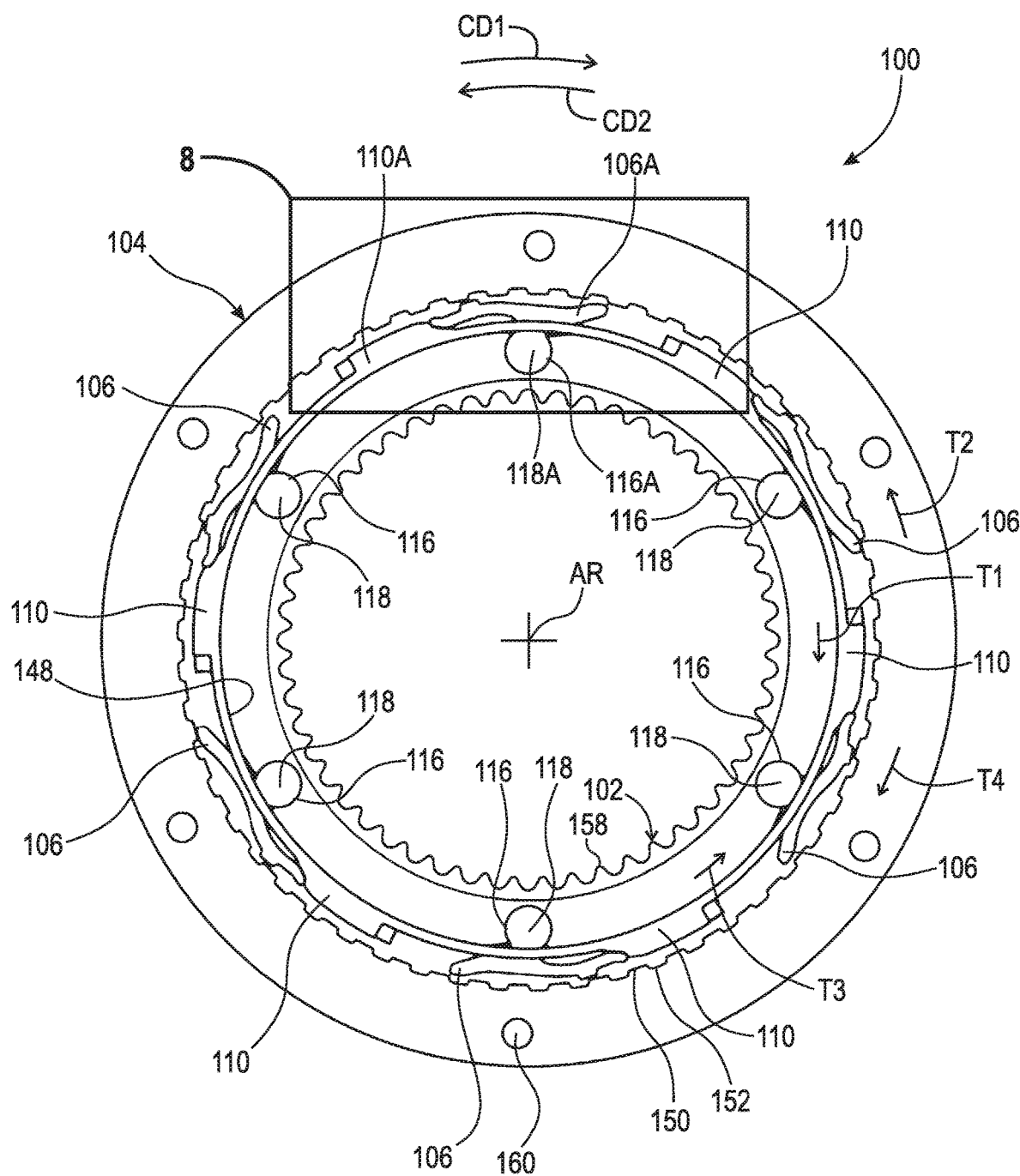
FIG. 3 is a front view of the switchable ratcheting clutch shown in FIG. 1 in a freewheel mode.

FIG. 3 is a front view of the switchable ratcheting clutch shown in FIG. 1 in a freewheel mode.

Figure 4:
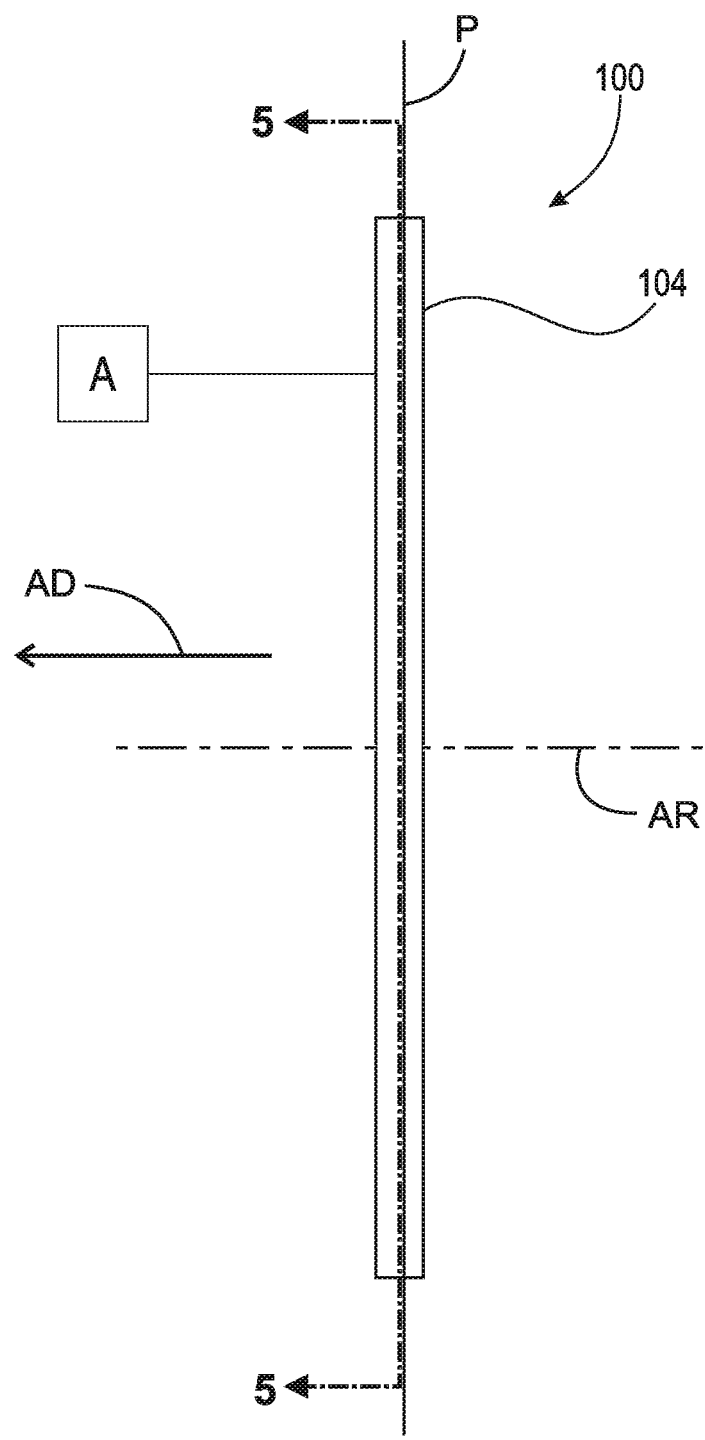
FIG. 4 is a side view of the switchable ratcheting clutch shown in FIG. 3.

FIG. 4 is a side view of switchable ratcheting clutch 100 shown in FIG. 3.

Figure 5:
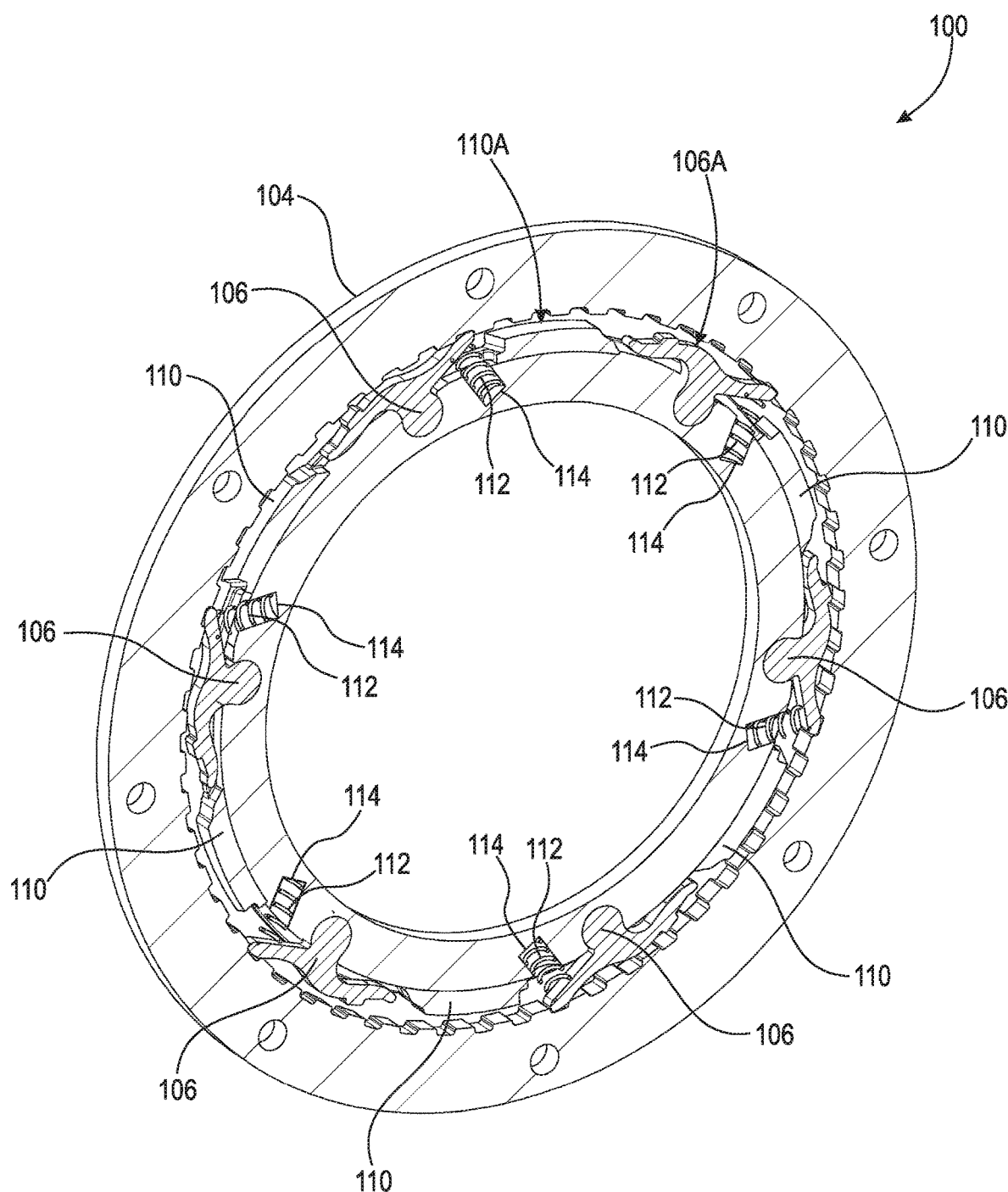
FIG. 5 is an isometric cross-sectional view generally along line 5-5 in FIG. 4.

FIG. 5 is an isometric cross-sectional view generally along line 5-5 in FIG. 4. The following should be viewed in light of FIGS. 1 through 5. Switchable ratcheting clutch 100 includes: inner race 102; outer race 104 radially offset from inner race 102, in particular, located radially outwardly from inner race 102; pawls 106; cage 108; ramps 110; and resilient elements 112. Inner race 102 includes indentations 114 and pockets 116. Resilient elements 112 are engaged with, for example in contact with, inner ring 102 and pawls 106. At least respective portions of resilient elements 112 are disposed in indentations 114. Each pawl 106 includes portion 118 disposed in a respective pocket 116. Cage 108 is radially disposed between inner race 102 and outer race 104. Inner race 102, cage 108, and outer race 104 are sequentially aligned, or positioned, radially outwardly in radially outer direction RD.

Figure 6:
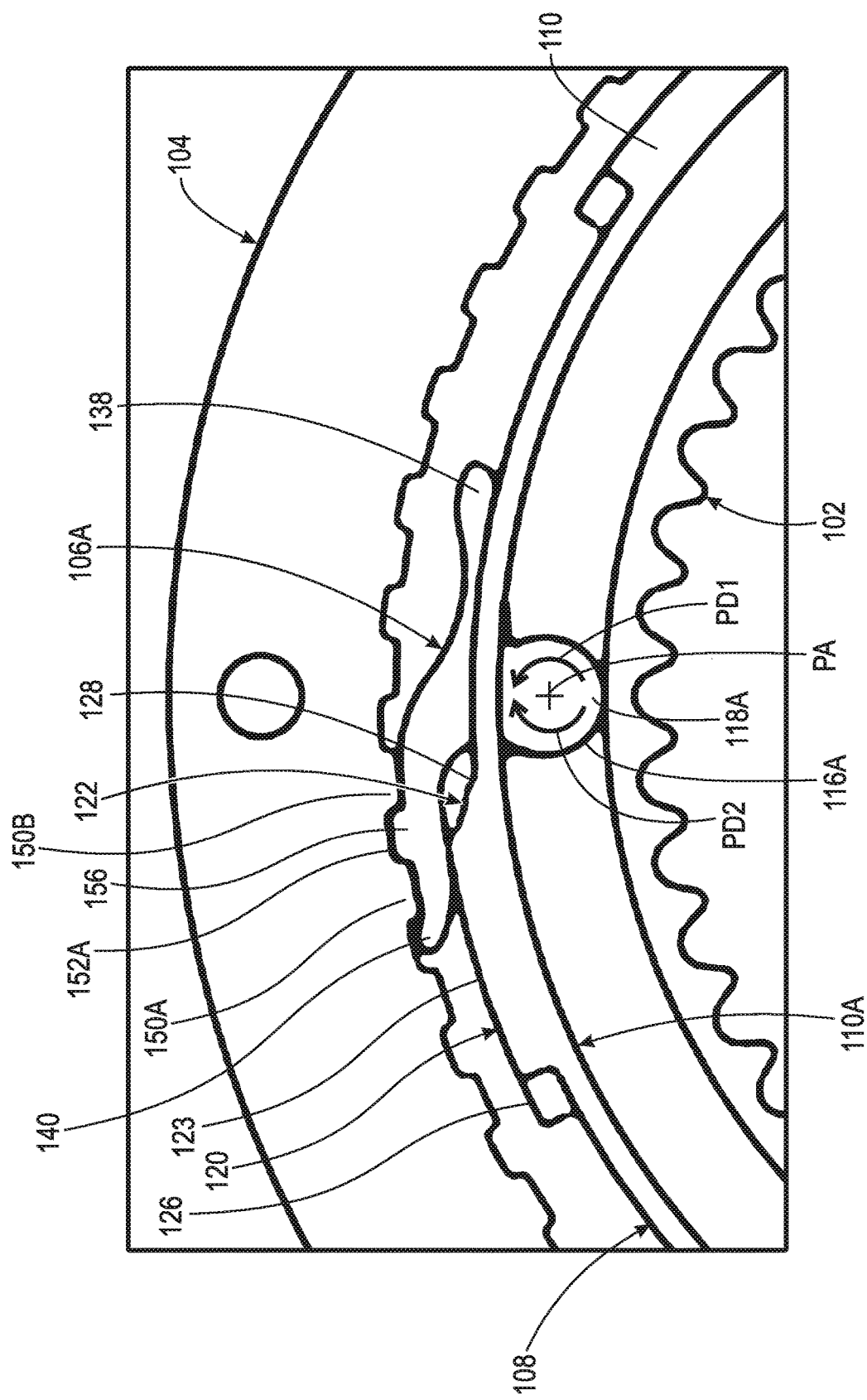
FIG. 6 is a detail of area 6 in FIG. 1.

FIG. 6 is a detail of area 6 in FIG. 1.

Figure 7:
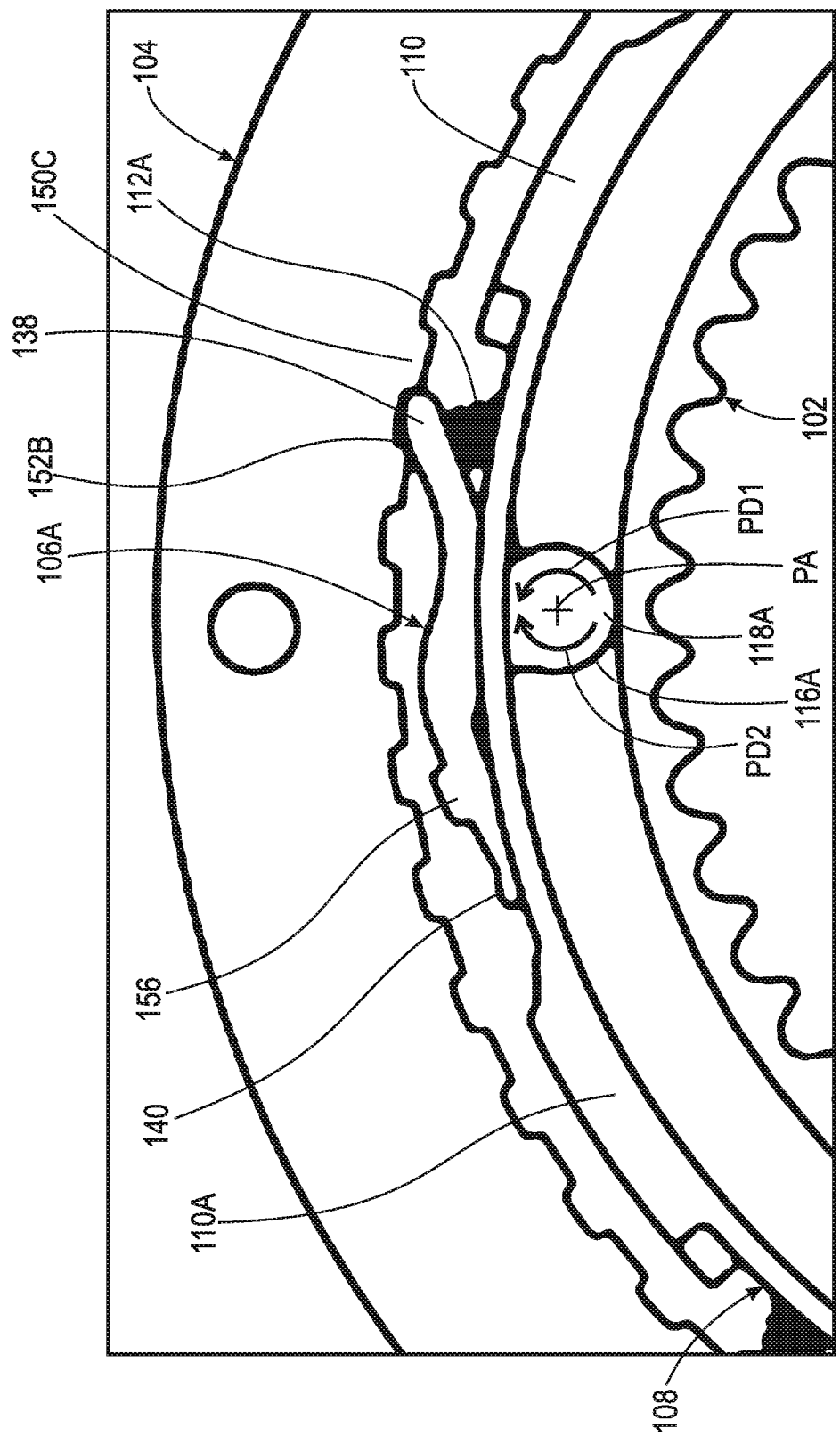
FIG. 7 is a detail of area 7 in FIG. 2.

FIG. 7 is a detail of area 7 in FIG. 2.

Figure 8:
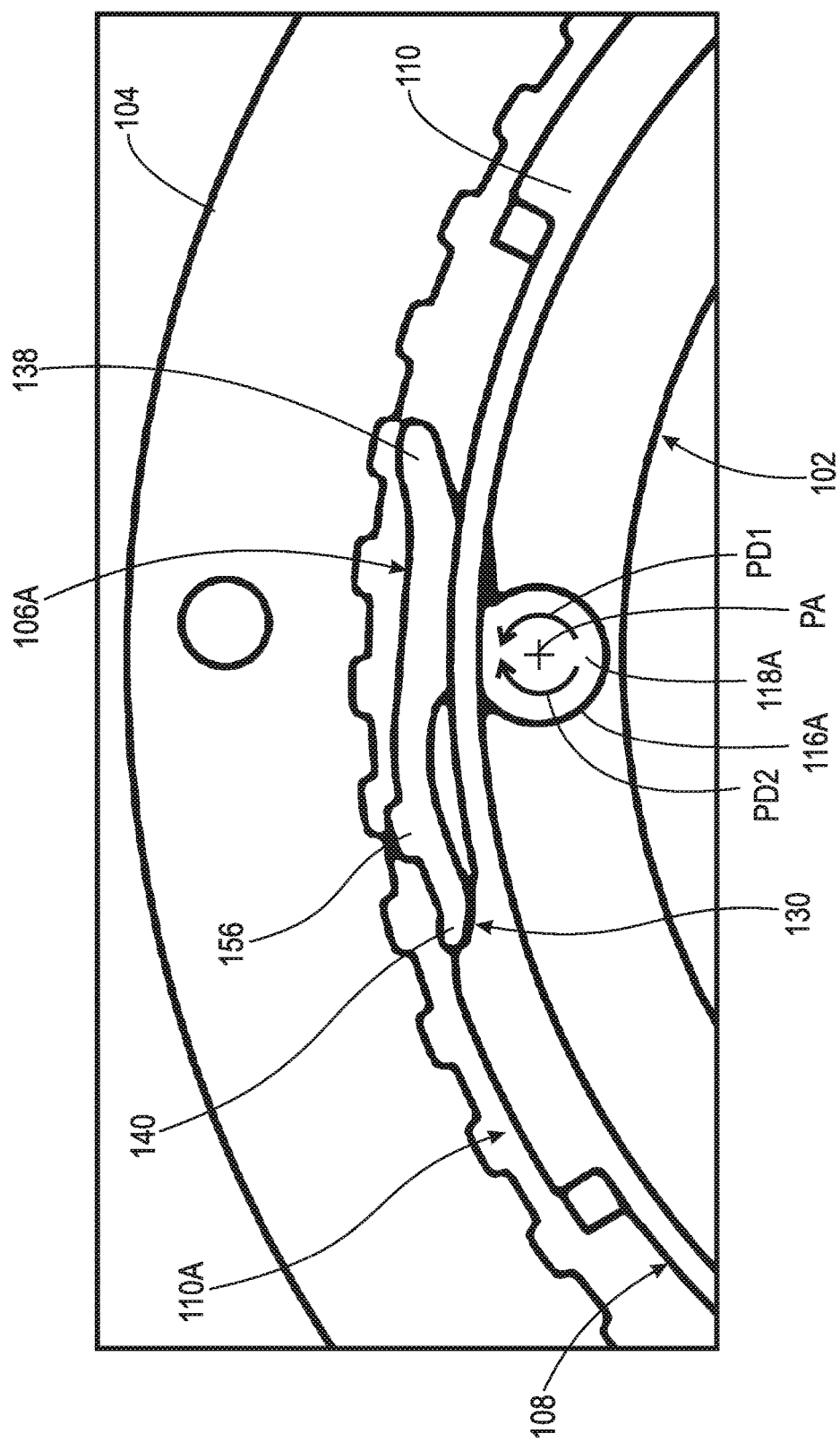
FIG. 8 is a detail of area 8 in FIG. 3.

FIG. 8 is a detail of area 8 in FIG. 3. The following should be viewed in light of FIGS. 1 through 8. The following discussion is directed to pawl 106A and ramp 110A. However, it should be understood that the discussion is applicable to each pawl 106 and each ramp 110 of clutch 100. Portions 118 and pawls 106 are pivotable within pockets 116 about respective axis PA. Each axis PA passes through a respective pocket 116 and a respective portion 118, and is parallel to an axis of rotation AR for clutch 100. For example, portion 118A in pocket 116A is pivotable about axis PA in opposite pivot directions PD1 and PD2 In general, a reference character "[number][number][number][letter]" designates a specific example of an element labeled as "[number][number][number]." For example, pawl 106A is a specific example from among pawls 106.

Figure 9:
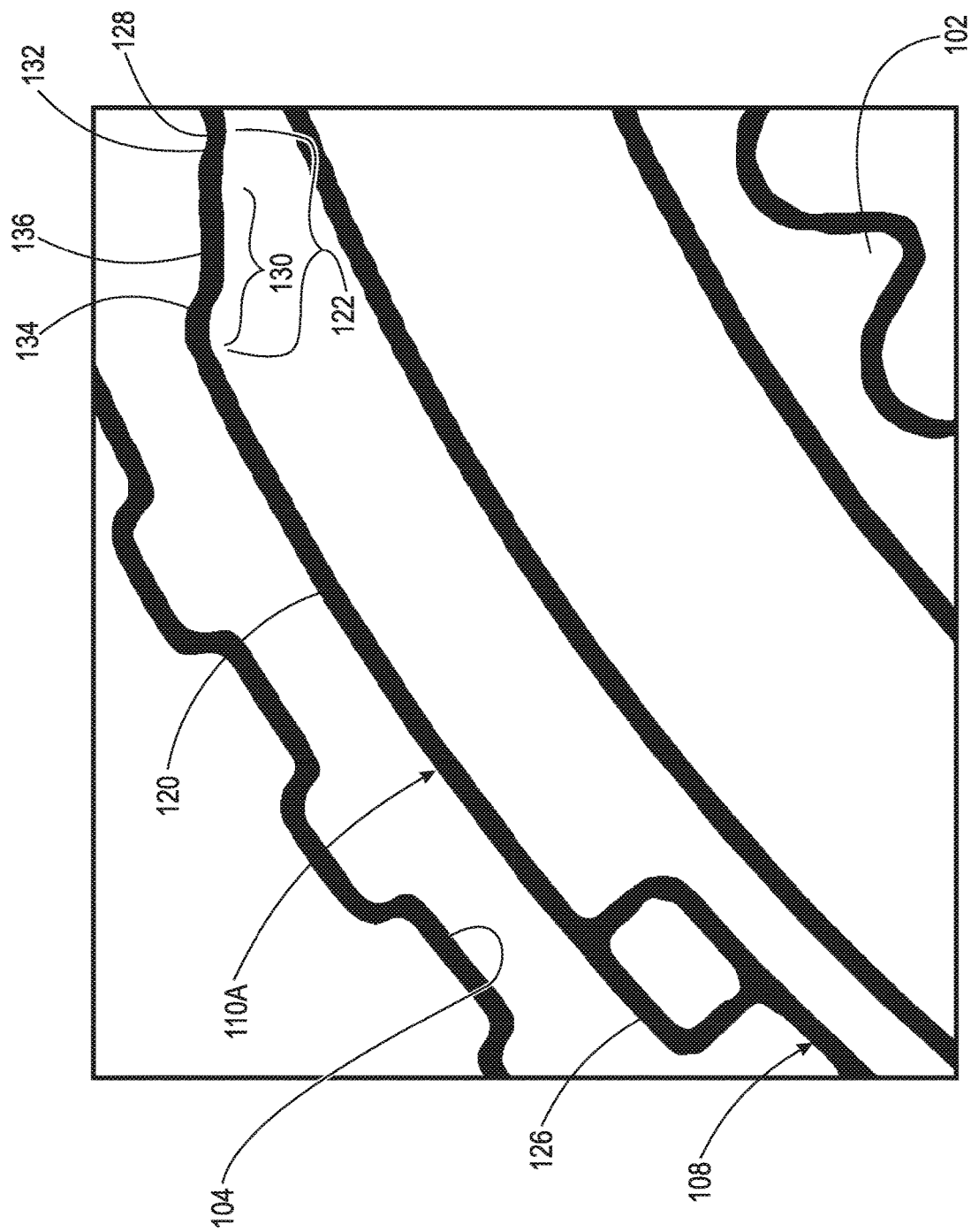
FIG. 9 is a detail of a ramp in FIG. 2.

FIG. 9 is a detail of ramp 110A in FIG. 2. The following should be viewed in light of FIGS. 1 through 9. Ramp 110A includes surface 120 and surface 122. Surface 122 is directly connected to surface 120 and slopes radially and circumferentially from surface 120. In the example of FIG. 1, surface 122 slopes radially inwardly in circumferential direction CD1 from surface 120. Surface 120 does not slope radially in circumferential direction CD1. Intersection 123 of plane P, orthogonal to axis of rotation AR and non-co-linear with axis of rotation AR, and surface 120 is at uniform distance 124, in radially outer direction RD, from axis of rotation AR. In an example embodiment, all of surface 120 is at uniform distance 124, in radially outer direction RD, from axis of rotation AR, that is, surface 120 is cylindrical. In an example embodiment (not shown), surface 120 slopes radially in axial direction AD, parallel to axis of rotation AR. In an example embodiment: surface 120 forms the portion of ramp 110A extending furthest radially outwardly, that is, in direction RD.

In the locked mode of switchable ratcheting clutch 100: pawl 106A is in contact with surface 120 of ramp 110A and with outer race 104; and pawl 106A, inner race 102, and outer race 104 are non-rotatably connected. In an example embodiment, in the locked mode, pawl 106A is free of contact with surface 122. In the locked mode, surface 120, pawl 106A, and outer race 104 are sequentially aligned in radially outward direction RD.

By "non-rotatably connected" components, we mean that components are connected so that whenever one of the components rotates, all the components rotate; and relative rotation between the components is precluded. Radial and/or axial movement of non-rotatably connected components with respect to each other is possible. Components connected by tabs, gears, teeth, or splines are considered as non-rotatably connected despite possible lash inherent in the connection. The input and output elements of a closed clutch are considered non-rotatably connected despite possible slip in the clutch. The input and output parts of a vibration damper, engaged with, for example in contact with, springs for the vibration damper, are not considered non-rotatably connected due to the compression and unwinding of the springs.

In the one-way mode of switchable ratcheting clutch 100: pawl 106A is in contact with outer race 104; resilient element 112A urges pawl 106A in direction PD1 and into contact with outer race 104; and relative rotation of inner race 102 with respect to outer race 104 is enabled only in circumferential direction CD2. In an example embodiment in the one-way mode, pawl 106A is free of contact with ramp 110A (or any other ramp 110).

In the freewheel mode of switchable ratcheting clutch 100: pawl 106A is in contact with surface 122; and race 102 and race 104 are rotatable with respect to each other. Stated otherwise, in the freewheel mode, relative rotation of the inner race 102 with respect to outer race 104 is enabled in circumferential direction CD1 and in circumferential direction CD2, opposite direction CD1. In an example embodiment, in the freewheel mode, pawl 106A is free of contact with surface 120.

Ramp 110A includes circumferential end 126 extending furthest in circumferential direction CD2 and circumferential end 128 extending furthest in circumferential direction CD1. In an example embodiment, surface 120 extends to circumferential end 126. In an example embodiment, surface 122 extends to circumferential end 128.

In an example embodiment, surface 122 includes: portion 130 directly connected to surface 120; and portion 132 directly connected to portion 130 and extending to end 128. Portion 130 extends radially and circumferentially from surface 120. Portion 132 extends radially and circumferentially from portion 130. In the example of FIG. 1: portion 130 extends radially inwardly in direction CD1 from surface 120; and portion 132 extends radially inwardly in direction CD1 from portion 130. Portion 130 portion forms a step or knuckle in surface 122. Portion 130 includes segment 134 and segment 136. Segment 134 is directly connected to surface 120, and segment 136 connects segment 134 and portion 132. Segment 134 slopes radially and circumferentially. In the example of FIG. 1: segment 134 slopes radially inwardly in direction CD1; and segment 136 slopes radially inwardly in direction CD1 less steeply than segment 134. In an example embodiment (not shown), segment 136 does not slope radially in direction CD1.

Pawl 106A includes circumferential end 138 extending furthest in circumferential direction CD1 and circumferential end 140 extending furthest in circumferential direction CD2. In the freewheel mode, resilient element 112A urges pawl 106A in direction PD1 and circumferential end 140 into contact with the step formed by portion 130.

Figure 10:
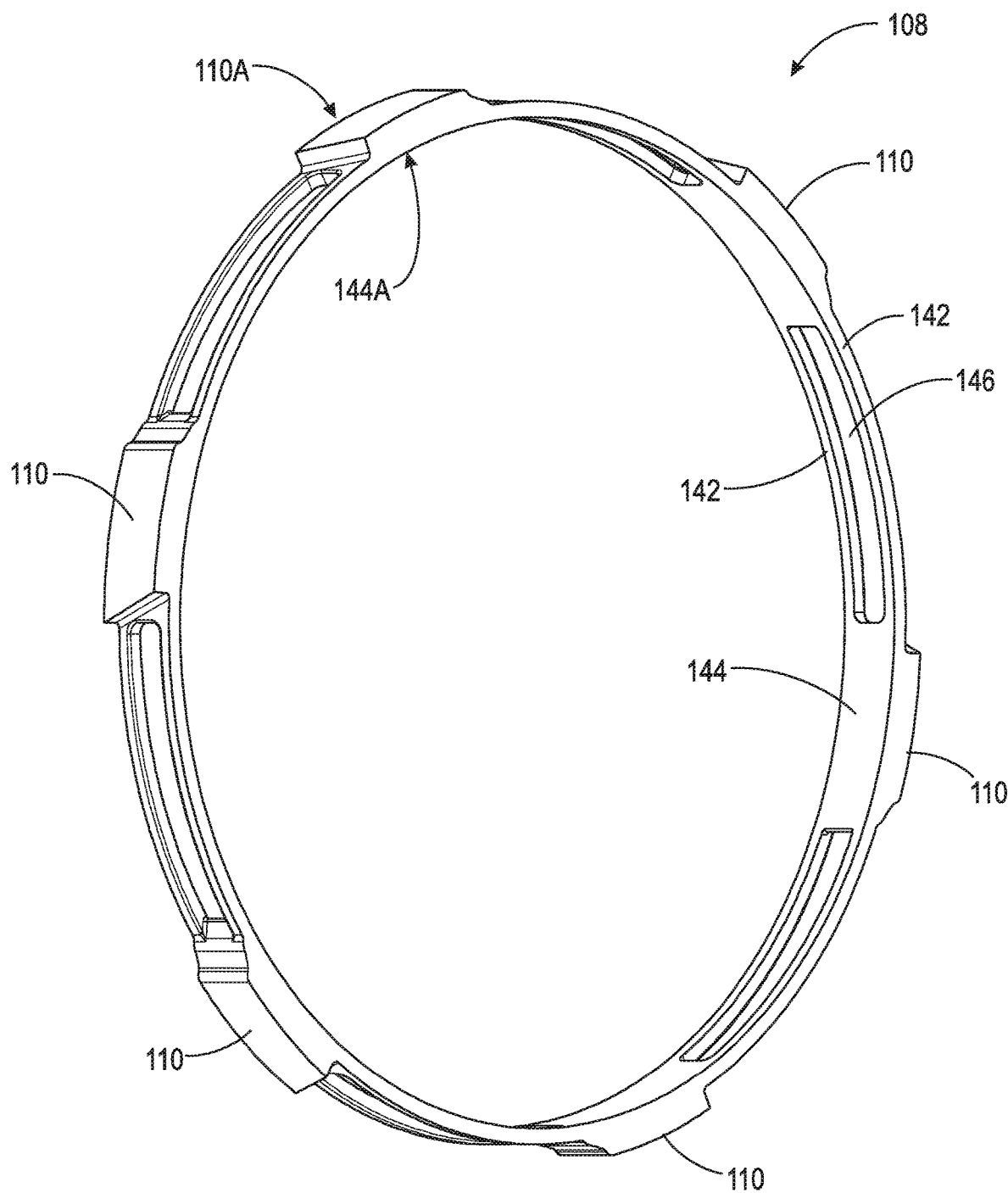
FIG. 10 is an isometric view of a cage of the switchable ratcheting clutch shown in FIG. 1.

FIG. 10 is an isometric view of cage 108 of switchable ratcheting clutch 100 shown in FIG. 1. The following should be viewed in light of FIGS. 1 through 10. Cage 108 is continuous in directions CD1 and CD2. Cage 108 includes: strip portions 142; portions 144 including ramps 110; and openings 146. For example, portion 144A includes ramp 110A. Portions 142 and 144 bound openings 146. Ramps 110 are fixed to portions 144. In an example embodiment, ramps 110 are integral to cage 108 and portions 144. Pawls 106 extend through respective openings 146. For example, pawl 106A extends through opening 146A. Cage 108 is engaged with radially outer surface 148 of inner race 102.

Figure 11:
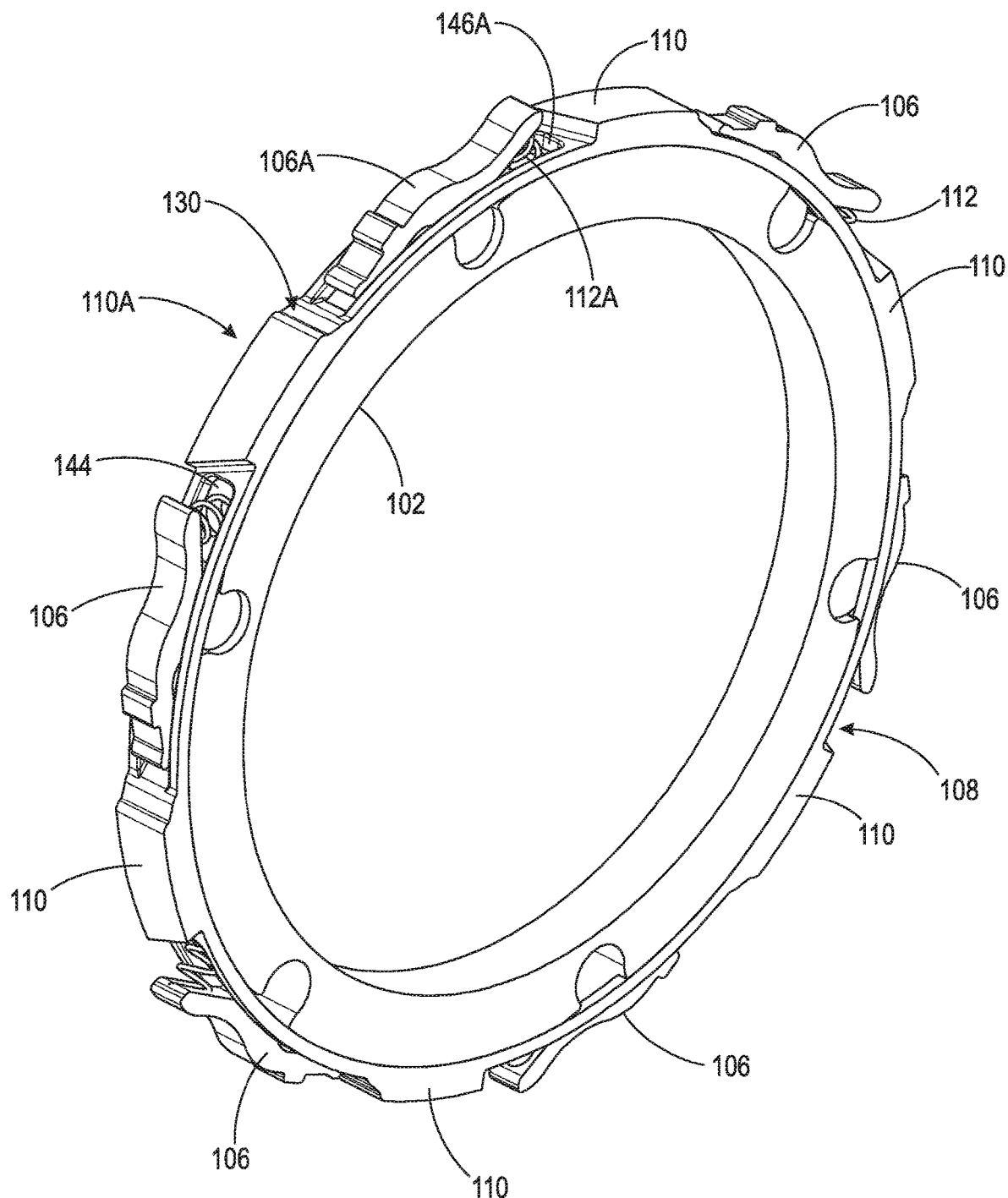
FIG. 11 is a front isometric view of the switchable ratcheting clutch shown in FIG. 2 with an outer race removed.

FIG. 11 is a front isometric view of switchable ratcheting clutch 100 shown in FIG. 2 with outer race 104 removed.

Figure 12:
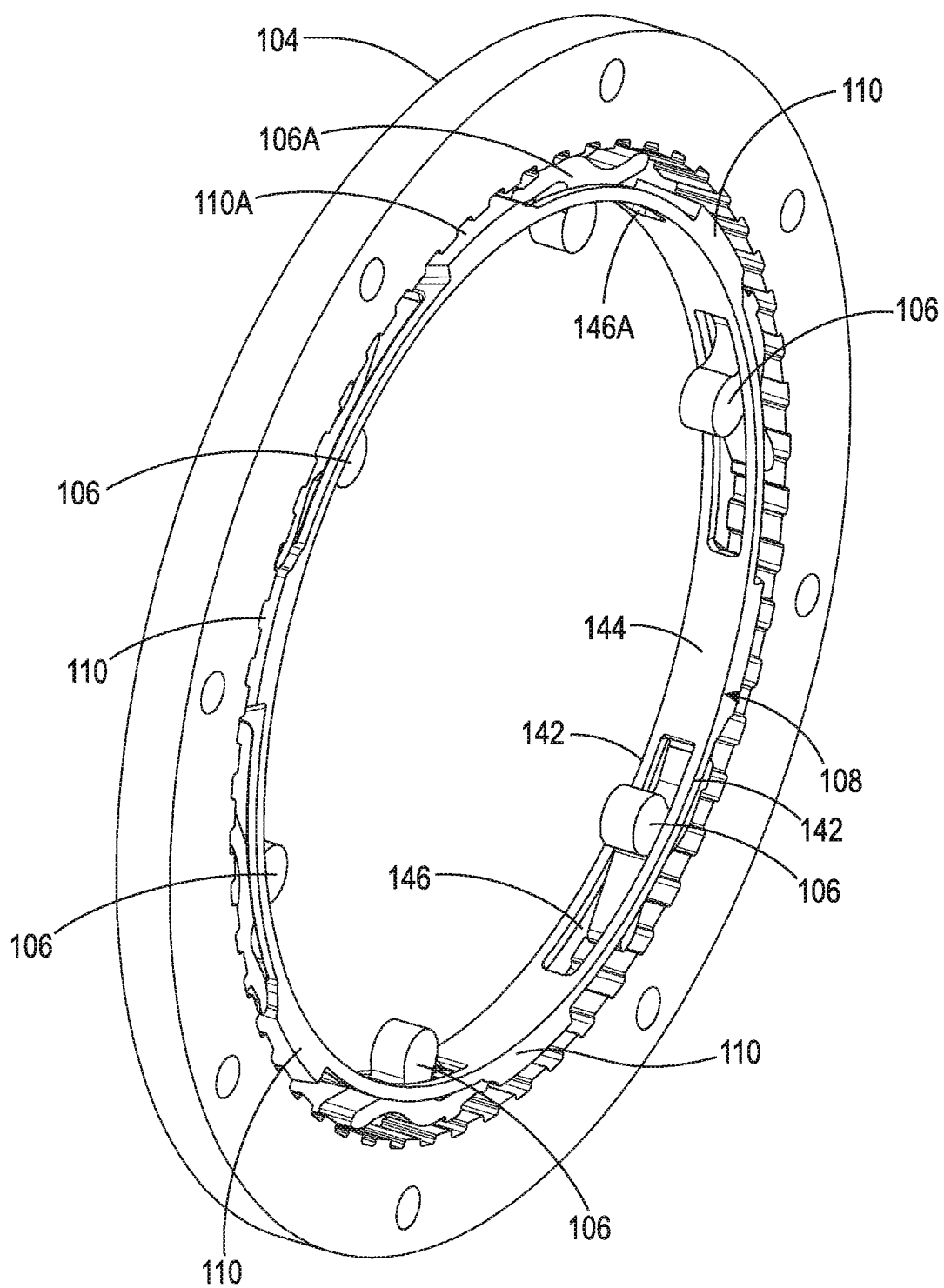
FIG. 12 is a front isometric view of the switchable ratcheting clutch shown in FIG. 2 with an inner race removed.

FIG. 12 is a front isometric view of switchable ratcheting clutch 100 shown in FIG. 2 with inner race 104 removed. The following should be viewed in light of FIGS. 1 through 12. Cage 108 and ramps 110 are arranged to be rotated by actuator A in directions CD1 and CD2, with respect to inner race 102, to switch clutch 100 among the locked, one-way, and freewheel modes. Actuator A is schematically shown in FIG. 4. In an example, embodiment, clutch 100 includes actuator A. Actuator A can be any actuator known in the art. In an example embodiment, cage 108 is in contact with radially outer surface 148 of inner race 102.

The following provides further detail regarding the structure and operation of clutch 100. To transition to the locked mode from the freewheel mode, cage 108 and ramp 110A are arranged to be rotated by A actuator in circumferential direction CD1 to slide surface 122 and portion 130 out of contact with pawl 106A to bring surface 120 into contact with pawl 106A. To transition to the locked mode from the one-way mode, cage 108 and ramp 110A are arranged to be rotated by A actuator in circumferential direction CD1 to slide surface 122 and portion 130 along pawl 106A to bring surface 120 into contact with pawl 106A.

To transition to the one-way mode from the locked mode, cage 108 and ramp 110A are arranged to be rotated by A actuator in circumferential direction CD2 to slide surface 120 and surface 122 along pawl 106A to disengage ramp 110A from pawl 106A. To transition to the one-way mode from the freewheel mode, cage 108 and ramp 110A are arranged to be rotated by A actuator in circumferential direction CD2 to slide surface 122 along pawl 106A to disengage ramp 110A from pawl 106A.

To transition to the freewheel mode from the locked mode, cage 108 and ramp 110A are arranged to be rotated by A actuator in circumferential direction CD2 to slide surface 120 along pawl 106A to bring surface 122 and portion 130 into contact with ramp 110A. To transition to the freewheel mode from the one-way mode, cage 108 and ramp 110A are arranged to be rotated by A actuator in circumferential direction CD1 to slide surface 122 and portion 130 into contact and with pawl 106A.

Clutch 100 is arranged to transition from the locked mode or the freewheel mode to the one-way mode for torque T1 or torque T2. Stated otherwise, clutch 100 is arranged to transition from the locked mode or the freewheel mode to the one-way mode for relative rotation of inner race 102 with respect to outer race 104 in direction CD1.

Clutch 100 is operable as a torque transmission device or as a brake. As a torque transmission device in the one-way mode: inner race 102 and outer race 104 are non-rotatably connected for a torque applied to inner race 102 in direction CD1, for example torque T1, or a torque applied to outer race 104 in direction CD2, for example torque T2; and torque T1 is transmitted to outer race 104, or torque T2 is transmitted to inner race 102. As a torque transmission device in the one-way mode: inner race 102 is rotatable with respect to outer race 104 for a torque applied to inner race 102 in direction CD2, for example torque T3, or a torque applied to outer race 104 in direction CD1, for example torque T4. For example: when torque T3 is applied, inner race 102 rotates in direction CD2 with respect to outer race 104; and when torque T4 is applied, outer race 104 rotates in direction CD1 with respect to inner race 102.

As a brake in the one-way mode with outer race 104 grounded, rotation of inner race 102 in direction CD1 for torque T1 is blocked and race 102 is rotatable in direction CD2 for torque T3. As a brake in the one-way mode with inner race 102 grounded, rotation of outer race 104 in direction CD2 for torque T2 is blocked and race 104 is rotatable in direction CD1 for torque T4.

As a torque transmission device in the locked mode: torque T1 is transmitted to outer race 102; torque T2 is transmitted to inner race 102; torque T3 is transmitted to outer race 104; and torque T4 is transmitted to inner race 102. As a brake in the locked mode and for outer race 104 grounded: rotation of inner race 102 in directions CD1 and CD2 is blocked. As a brake in the locked mode and for inner race 102 grounded: rotation of outer race 104 in directions CD1 and CD2 is blocked.

As seen in FIGS. 1, 2, and 3, cage 108 and ramps 110 are rotated by actuator A into first, second, and third circumferential positions, around axis AR and with respect to inner race 102, for the locked, one-way, and freewheel modes, respectively. The first, second, and third circumferential positions are different from each other. For example, using pawl 106A as a fixed circumferential reference point for inner race 102 (i.e., twelve o'clock in FIGS. 1 through 3): in FIG. 2, ramp 110A is furthest in direction CD2; in FIG. 1, ramp 110A is furthest in direction CD1; and in FIG. 3, ramp 110A is circumferentially between the positions of ramp 110A in FIGS. 1 and 2.

Pawls 106 are pivotable about axis PA in opposite pivot direction PD1 and PD2. Resilient element 112A urges pawl 106A with force F in direction PD1 about axis PA. Pawl 106A is in first, second, and third pivot, or circumferential, positions with respect to pivot axis PA and in directions PD1 and PD2, for the locked, one-way, and freewheel modes, respectively. For example: in the locked mode, pawl 106A is rotated furthest in direction PD2; in the one-way mode, pawl 106A is rotated furthest in direction PD1; and in the freewheel mode, pawl 106A is between the positions of pawl 106A, with respect to directions PD1 and PD2, in the locked mode and the one-way mode. In the one-way mode, force F urges end 138 into contact with outer race 104. In the freewheel mode, end 140 partially compresses resilient element 112A and force F urges end 140 into contact with portion 130 to stabilize the position of pawl 106A about axis PA. In the locked mode, end 138 compresses resilient element 112A to the greatest amount.

Figure 13:
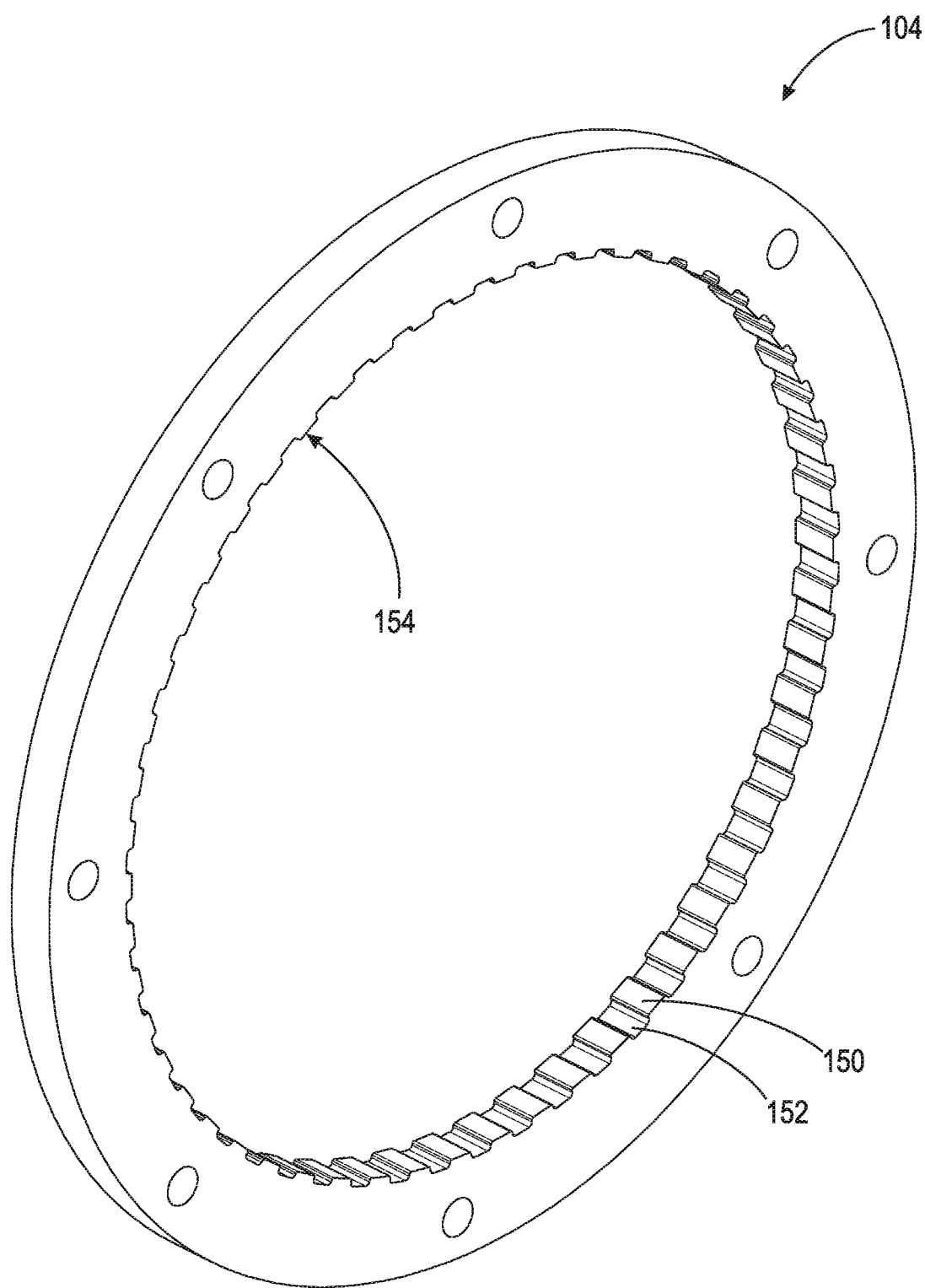
FIG. 13 is an isometric view of the outer race shown in FIG. 1.

FIG. 13 is an isometric view of outer race 104 shown in FIG. 1. In an example embodiment, outer race 104 includes splines, or teeth, 150, and grooves 152 in radially inner surface 154 of outer race 104; and pawl 106A includes tooth 156. Splines 150 and grooves 152 are interleaved, or alternate, in directions CD1 and CD2. In the locked mode shown in FIGS. 1 and 6: tooth 156 is disposed in groove 152A; and tooth 156 is bracketed in direction CD1 by splines 150A and 150B. In the one-way mode shown in FIGS. 2 and 7, end 138 of pawl 106A is disposed in groove 152B and in contact with spline 150C.

In the example of FIG. 1, inner race includes splines 158 arranged to non-rotatably connect to a rotatable shaft or to a fixed shaft (ground) (neither shown) and outer race 104 includes openings 160 for use in fastening outer race 104 to a rotatable shaft or to a fixed shaft (ground) (neither shown).

In the example of FIGS. 1-13, clutch 100 is shown with six each of: pawls 106; ramps 110 and resilient elements 112. However, it should be understood that other numbers of pawls 106; ramps 110 and resilient elements 112 are possible.

Because surface 120 does not slope radially along circumferential directions CD1 or CD2, there is no kick-out force generated by contact between surfaces 120 and pawls 106 in the locked mode of clutch 100. For example, there is no kick-out force on ramps 106 in direction CD2 or in direction CD2 in the locked mode. As a result, the torque or load bearing capacity of clutch 100 is increased.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE CHARACTERS

A actuator
AR axis of rotation
AD axial direction
CD1 circumferential direction
CD2 circumferential direction
F force
P plane
PA pivot axis
PD1 pivot direction
PD2 pivot direction
RD radially outer direction
T1 torque
T2 torque
T3 torque
T4 torque
100 switchable ratcheting clutch
102 inner race
104 outer race
106 pawl
106A pawl
108 cage
110 ramp
110A ramp
112 resilient element
112A resilient element
114 indentation
116 pocket
116A pocket
118 portion, pawl
118A portion, pawl
120 surface, ramp
122 surface, ramp
123 intersection, surface 120 and plane P
124 distance
126 circumferential end, ramp
128 circumferential end, ramp
130 portion, surface 122
132 portion, surface 122
134 segment, portion 130
136 segment, portion 130
138 circumferential end, pawl
140 circumferential end, pawl
142 strip portion, cage
144 portion, cage
146 opening, cage
146A opening, cage
148 radially outer surface, inner race
150 spline, outer race
150A spline, outer race
150B spline, outer race
150C spline, outer race
152 groove, outer race
152A groove, outer race
152B groove, outer race
154 radially inner surface, outer race
156 tooth, pawl
158 spline, inner race
160 opening, outer race

The invention claimed is:

1. A switchable ratcheting clutch, comprising:
a first race including a pocket;
a second race radially offset from the first race;
a pawl including a portion disposed in the pocket and pivotable within the pocket; and,
a cage radially disposed between the first race and the second race and including a ramp, the ramp including a first surface, and a second surface sloping radially and circumferentially from the first surface, wherein the first surface does not slope radially along a first circumferential direction; wherein in a locked mode of the switchable ratcheting clutch, the pawl is in contact with the first surface and the second race, and the first race and the second race are non-rotatably connected; and wherein in a freewheel mode of the switchable ratcheting clutch, the pawl is in contact with the second surface, and relative rotation of the first race with respect to the second race is enabled.

2. The switchable ratcheting clutch of claim 1, wherein the first surface is at a uniform distance, in a radially outer direction, from an axis of rotation of the switchable ratcheting clutch.

3. The switchable ratcheting clutch of claim 1, wherein an intersection of a plane, orthogonal to an axis of rotation of the switchable ratcheting clutch and non-co-linear with the axis of rotation, and the first surface is at a uniform distance, in a radially outer direction, from the axis of rotation in a radially outer direction.

4. The switchable ratcheting clutch of claim 1, wherein in the locked mode the first surface, the pawl and the second race are sequentially radially aligned, and the pawl is free of contact with the second surface; and wherein in the freewheel mode, the pawl is free of contact with the first surface.

5. The switchable ratcheting clutch of claim 1, wherein the ramp includes a first circumferential end extending furthest in the first circumferential direction, and the first surface extends to the first circumferential end; and wherein the ramp includes a second circumferential end extending furthest in a second circumferential direction, opposite the first circumferential direction, and the second surface extends to the second circumferential end.

6. The switchable ratcheting clutch of claim 1, wherein in a one-way mode of the switchable ratcheting clutch, the pawl is in contact with the second race, and relative rotation of the first race with respect to the second race is enabled only in the first circumferential direction.

7. The switchable ratcheting clutch of claim 6, further comprising:
a resilient element, wherein the second surface includes a step; and wherein the pawl includes a circumferential end, and in the freewheel mode the resilient element urges the circumferential end into contact with the step.

8. The switchable ratcheting clutch of claim 1, further comprising:
a resilient element engaged with the first race and in contact with the pawl, wherein in the freewheel mode, the resilient element urges the pawl into contact with the second surface.

9. The switchable ratcheting clutch of claim 1, further comprising:
a resilient element engaged with the first race and in contact with the pawl, wherein in a one-way mode of the switchable ratcheting clutch, the pawl is free of contact with the ramp, the resilient element urges the pawl into contact with the second race, and relative rotation of the first race with respect to the second race is enabled only in the first circumferential direction.

10. The switchable ratcheting clutch of claim 1, wherein in a one-way mode of the switchable ratcheting clutch, the pawl is free of contact with the ramp, the pawl is in contact with the second race, and relative rotation of the first race with respect to the second race is enabled only in the first circumferential direction; wherein to transition to the one-way mode from the locked mode or from the freewheel mode, the cage and the ramp are arranged to be rotated by an actuator in the first circumferential direction to disengage the ramp from the pawl.

11. The switchable ratcheting clutch of claim 1, wherein to transition from the freewheel mode to the locked mode, the cage and the ramp are arranged to be rotated by an actuator in a second circumferential direction, opposite the first circumferential direction, to slide the second surface along the pawl and to contact the pawl with the first surface.

12. The switchable ratcheting clutch of claim 1, wherein the second surface includes a first portion directly connected to the first surface, and a second portion extending radially and circumferentially from the first portion; wherein in a one-way mode of the switchable ratcheting clutch, the pawl is in contact with the second race, and relative rotation of the first race with respect to the second race is enabled only in the first circumferential direction; wherein to transition from the one-way mode to the freewheel mode, the cage and the ramp are arranged to be rotated by an actuator in a second circumferential direction, opposite the first circumferential direction, to slide the second portion along the pawl to bring the first portion into contact with the pawl; and wherein to transition from the one-way mode to the locked mode, the cage and the ramp are arranged to be rotated by the actuator in the second circumferential direction to slide the second surface along the pawl to bring the first surface into contact with the pawl.

13. The switchable ratcheting clutch of claim 1 wherein the second race is located radially outwardly from the first race.

14. A switchable ratcheting clutch, comprising:
a first race including a pocket;
a second race;
a pawl including a portion disposed in the pocket and pivotable within the pocket; and,
a cage radially disposed between the first race and the second race and including a ramp, the ramp including a first surface, and a second surface sloping radially and circumferentially from the first surface, wherein the first surface does not slope radially along a first circumferential direction; wherein in a locked mode of the switchable ratcheting clutch, the pawl is in contact with the first surface and the second race, and the first race, the pawl, and the second race are non-rotatably connected; and wherein in a one-way mode of the switchable ratcheting clutch, the pawl is in contact with the second race, and relative rotation of the first race with respect to the second race is enabled only in the first circumferential direction.

15. The switchable ratcheting clutch of claim 14, wherein in a freewheel mode of the switchable ratcheting clutch, the pawl is in contact with the second surface, and the first race and the second race are rotatable with respect to each other.

16. The switchable ratcheting clutch of claim 15, wherein in the locked mode, the ramp is in a first circumferential position with respect to the first race; wherein in the one-way mode, the ramp is in a second circumferential position with respect to the first race; wherein in the freewheel mode, the ramp is in a third circumferential position with respect to the first race; and wherein the third circumferential position is between the first circumferential position and the second circumferential position.

17. The switchable ratcheting clutch of claim 14, wherein the second surface includes a first portion directly connected to the first surface, the first portion forms a step in the second surface, and the second surface includes a second portion extending radially and circumferentially from the step; and wherein in a freewheel mode of the switchable ratcheting clutch the pawl is in contact with the step, and the first race and the second race are rotatable with respect to each other.

18. The switchable ratcheting clutch of claim 14, further comprising:
a resilient element engaged with the first race and in contact with the pawl, wherein in a freewheel mode of the switchable ratcheting clutch, the resilient element urges the pawl into contact with the second surface and the first race and the second race are rotatable with respect to each other; and wherein in the one-way mode, the resilient element urges the pawl into contact with the second race.

19. The switchable ratcheting clutch of claim 14, wherein the second race is located radially outward of the first race.

20. A switchable ratcheting clutch, comprising:
an inner race including a pocket;
an outer race;
a pawl including a portion disposed in the pocket and pivotable within the pocket;
a cage radially disposed between the inner race and the outer race and including a ramp, the ramp including a first surface and a second surface; and,
a resilient element, wherein the first surface is at a uniform distance, in a radially outer direction, from an axis of rotation for the switchable ratcheting clutch, and the second surface slopes radially inwardly and in a first circumferential direction from the first surface; wherein in a locked mode of the switchable ratcheting clutch, the pawl is in contact with the first surface and the outer race, and the inner race, the pawl and the outer race are non-rotatably connected; wherein in a one-way mode of the switchable ratcheting clutch, the resilient element urges the pawl into contact with the outer race, and relative rotation of the inner race with respect to the outer race is enabled only in a second circumferential direction, opposite the first circumferential direction; and wherein in a freewheel mode of the switchable ratcheting clutch, the resilient element urges the pawl into contact with the second surface, and the inner race and the outer race are rotatable with respect to each other.

* * * * *